Figure 1:
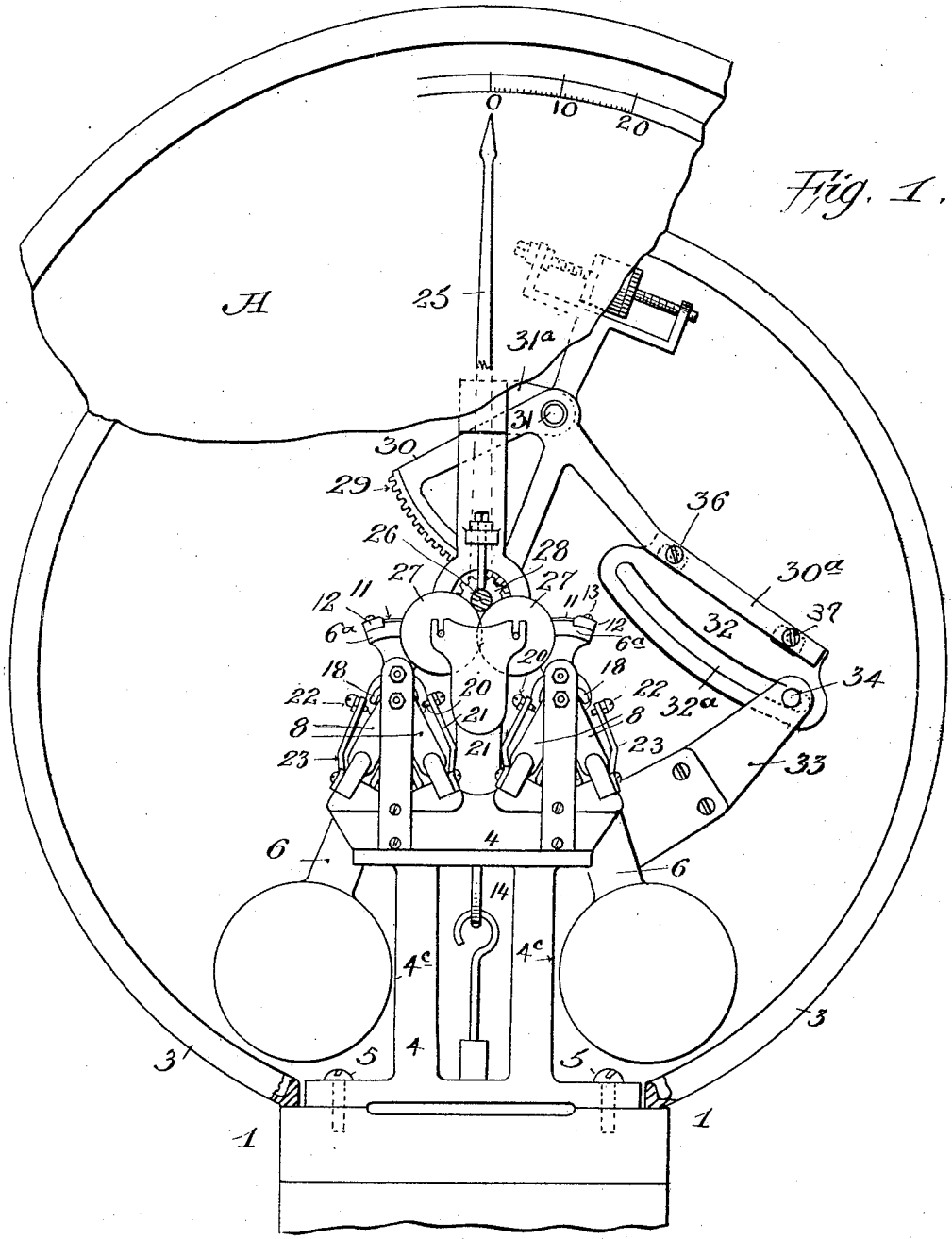

C. F. LARSON.
MEASURING INSTRUMENT.
APPLICATION FILED MAY 11, 1917.

1,333,926.

Patented Mar. 16, 1920.
3 SHEETS—SHEET 1.

Inventor
Carl F. Larson.
by his atty. T. F. Bourne

C. F. LARSON.
MEASURING INSTRUMENT.
APPLICATION FILED MAY 11, 1917.
1,333,926.
Patented Mar. 16, 1920.
3 SHEETS—SHEET 2.
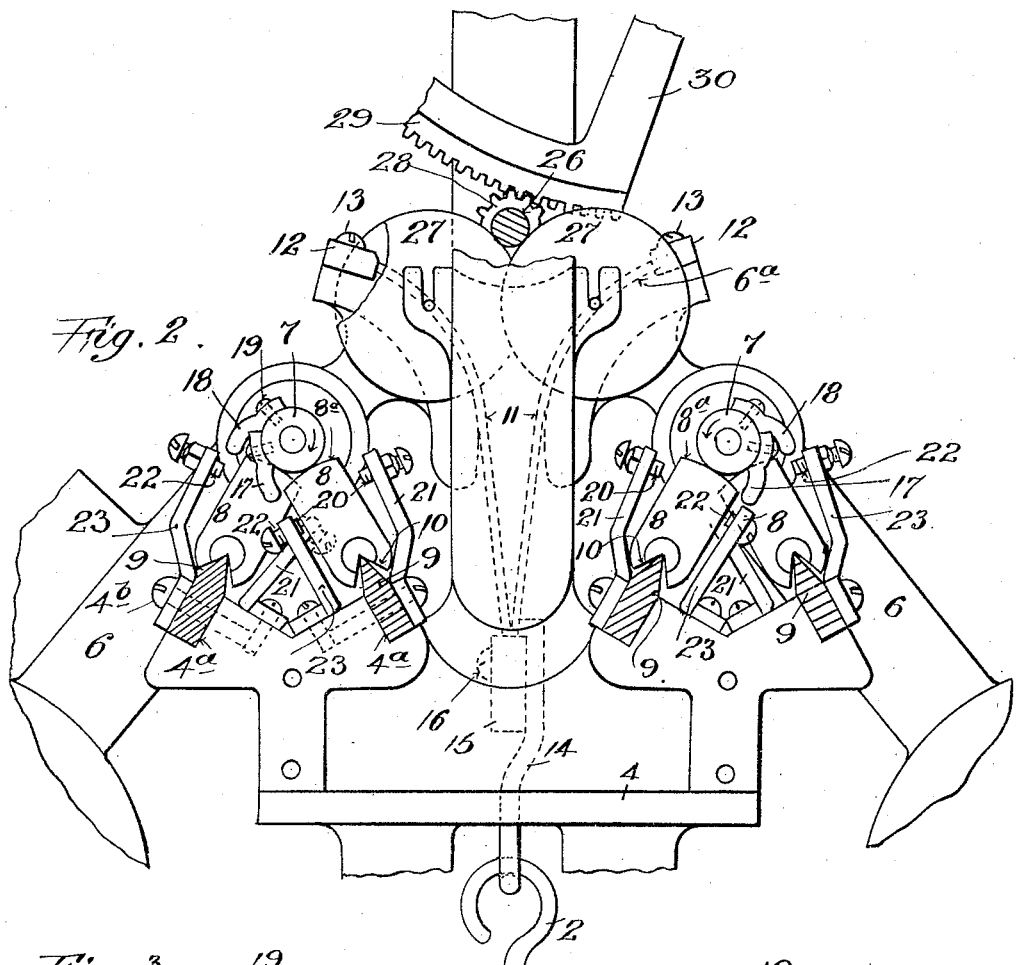
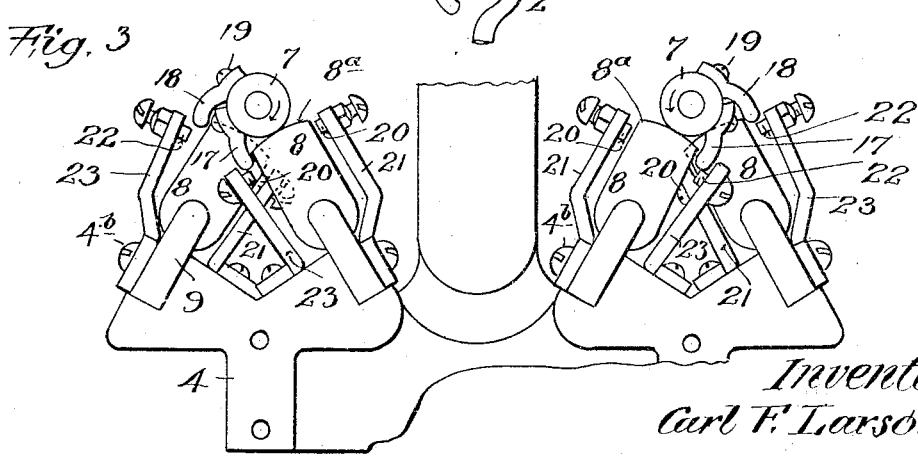
Inventor
Carl F. Larson
by his atty T. A. Bourne C. F. LARSON.
MEASURING INSTRUMENT.
APPLICATION FILED MAY 11, 1917.
1,333,926.
Patented Mar. 16, 1920.
3 SHEETS—SHEET 3.
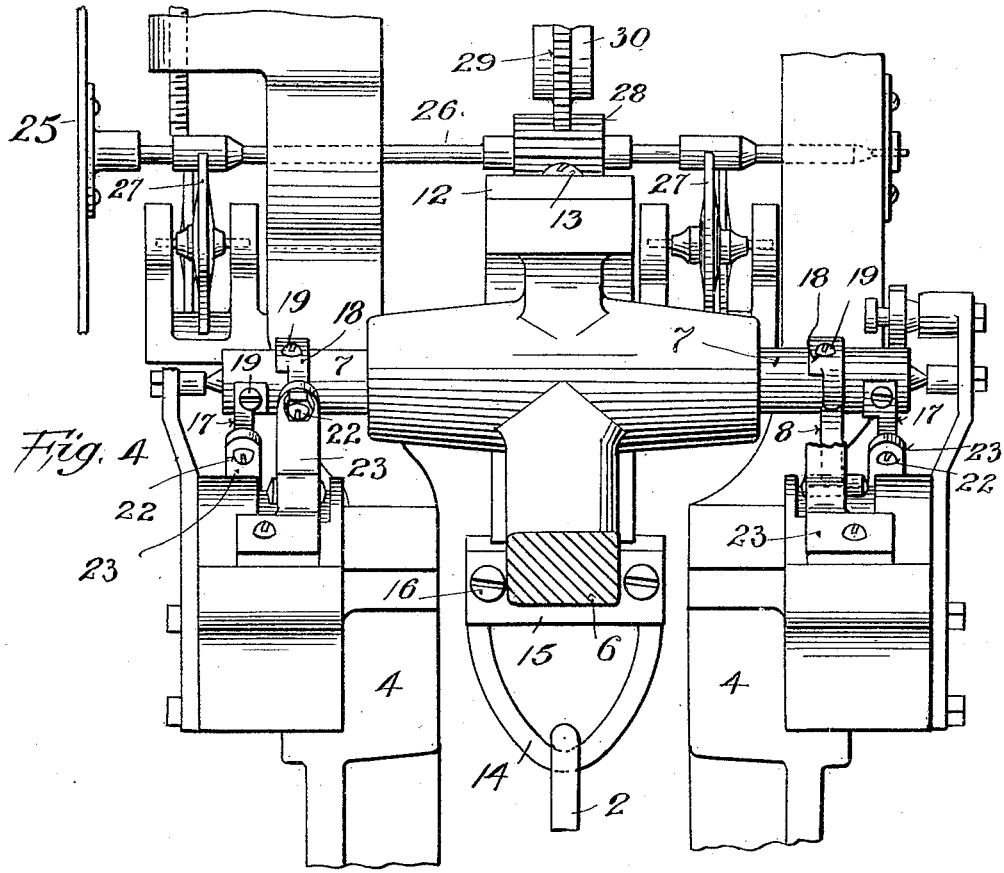
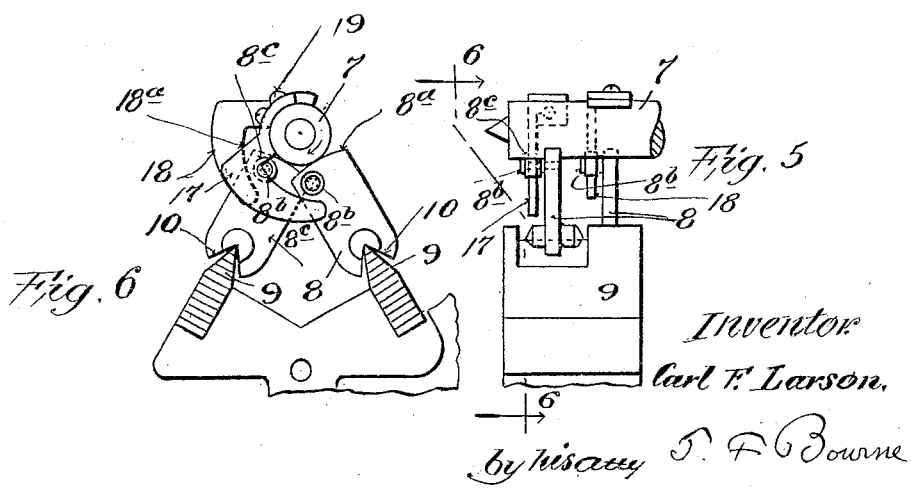
Inventor
Carl F. Larson,
by his atty J. F. Bourne

UNITED STATES PATENT OFFICE.

CARL F. LARSON, OF CHICAGO, ILLINOIS.

MEASURING INSTRUMENT.

1,333,926. Specification of Letters Patent. Patented Mar. 16, 1920.

Application filed May 11, 1917. Serial No. 167,851.

*To all whom it may concern:*

Be it known that I, CARL F. LARSON, a subject of the King of Sweden, and resident of Chicago, in the county of Cook and State of Illinois, have invented certain new and useful Improvements in Measuring Instruments, of which the following is a specification.

My invention has reference to improvements in the class of measuring instruments or weighing scales comprising a movable lever or arm having pivots supported upon movable members upon which such pivots roll, the lever or arm being connected with a platform or other means adapted to receive the articles to be weighed, indicating means being operated by or from such lever or arm. The best weighing results are obtained when the aforesaid movable members maintain a proper or an approximately definite relation to the pivots thereon, and are not obstructed in their rocking movements under the pivots during weighing. There is a liability that such members will be displaced from their proper operating relation to their pivots by reason of shocks or jars to which the scales are liable to be subjected, or by creeping or skidding of such parts. The leading object of my invention is to provide simple and efficient means that will permit such movable members to freely move by reason of the rolling of said pivots thereon and yet will serve to restore such members to their proper relations with respect to said pivots, upon the return of the lever or arm to the normal or zero position, in case such members have been displaced from such position.

A further object of my invention is to provide stops spaced from such movable members in their zero or normal positions and adapted to limit undue movement of such members with respect to the pivots thereon, whereby to assure that such members cannot move too far from their proper positions respecting such pivots, certain of which stops may be utilized in the restoration of the members to their proper positions after a weighing operation, in case they have been displaced therefrom.

In carrying out my invention I provide in a measuring instrument having movable members and pivots supporting movable levers or arms thereon, means connected with the pivots permitting the latter to rotate at all times freely with respect to said members for the weighing operations, and adapted to coöperate with said members to restore them to their proper positions upon the return of the levers or arms to the zero position in case a member has been displaced from its proper position with respect to the pivot thereon, whereby to assure for each weighing operation a proper relation of such movable members to the corresponding pivots.

In the embodiment of my invention illustrated in the accompanying drawings I provide a projection upon each pivot for a corresponding movable member adapted to coöperate with the latter in case it has been displaced from its proper relation to the pivot to restore the member to such position upon the return of the corresponding lever to zero, such projection moving relatively to such member without resisting or controlling the same when the lever or arm is moved during a weighing operation. I also provide a stop for each member located in such position that the aforesaid projection may move the corresponding member into engagement with such stop substantially at the limit of the return stroke of the lever from a weighing operation to assure the proper accurate restoration of the corresponding member to the proper position in case such member may have moved from such position by reason of shocks or jars, or creeping of the member with respect to the corresponding pivot, or for other causes.

My invention further comprises novel details of improvement and combinations of parts that will be more fully hereinafter set forth and then pointed out in the claims.

Reference is to be had to the accompanying drawings forming part hereof, wherein.

Figure 1 is a front elevation of a weighing mechanism embodying my invention, illustrating a dial and indicator or pointer partly broken away; Fig. 2 is an enlarged detail partly sectional view of parts shown in Fig. 1, illustrating the movable parts in an operated position; Fig. 3 is a detail of part of Fig. 2 illustrating the parts in the zero position; Fig. 4 is a side elevation of Fig. 2, partly in section; Fig. 5 is a detail side view illustrating a modification, and Fig. 6 is a section on the line 6, 6, in Fig. 5.

Similar numerals of reference indicate corresponding parts in the several views.

At 1 is indicated a support for the weighing mechanism, which may comprise a standard or upright extending from a weighing platform, to which latter a draft rod 2 may be connected in any well known manner. At 3 is a casing adapted to inclose the weighing mechanism and at A is a suitable dial which may be connected with said casing in any well known manner. A suitable frame is indicated at 4, shown secured upon support 1 by screws 5, which frame supports the operating devices. At 6 are levers or weighted arms provided at opposite sides with pivots or gudgeons 7 adapted to be supported by and to roll on movable members 8. Said members 8 may be supported to rock in any suitable manner, and as a means to delicately support said members I have shown knife edges 9 received in V-like recesses 10 of the members 8, whereby the members rest upon the knife edges. The knife edges are shown set in recesses 4ª in frame 4 and secured in place by screws 4ᵇ. In the example illustrated the sharpened ends of the knife edges 9 and the apices of the recesses 10 are so located that planes passing therethrough coincide at the axes of the corresponding pivot 7 of lever 6, whereby the weight of and that imposed upon lever 6 is transmitted to the corresponding members 8 and the knife edges along or in the direction of such planes from the points on the peripheries of the pivots or gudgeons where they touch the peripheries of the corresponding members 8 in such planes, whereby direct thrusts of the weight are imposed through members 8 upon the knife edges in any position of said members. The arrangement provides a delicate and positive support to enable the members 8 to rock or oscillate with a minimum of friction in either direction of movement of the members as caused by the rotation of the pivots or gudgeons in contact therewith, in varying positions in which the levers may be tilted by reason of the load upon the platform or scale pan through the scale mechanism connected with the lever. The arrangement described affords advantage of protection against accumulation of dust and other foreign matter between the members and their supports which would have a tendency to detract from the accuracy of the action of the scale mechanism. The arrangement is also superior to the supporting of movable members upon ordinary annular bearings, whereby to avoid accumulation of dust, foreign substances and oil on the movable supporting parts which would have a tendency to detract from the accuracy of the scale. My present improvements, however, are not limited to the support of the movable members for the pivots of the levers in manner set forth in cases where other means of supporting such levers may be found desirable.

The surfaces 8ª of members 8 are suitably curved to permit the ready rolling of the pivots 7 thereon, whereby the members 8 may rock as the levers are operated. There may be one or more levers or weighted arms 6 in the weighing mechanism, and a description of one and parts coöperative therewith will apply to both. The lever 6 may be operated or rocked during a weighing operation by any suitable means connecting the same with the scale platform, pan or the like. I have illustrated the lever 6 having a curved upper portion 6ª to which a flexible band or connection 11 may be attached by any suitable means, such as by a block 12 and screw 13, securing such band to the lever, whence the band depends over the curved surface 6ª of the lever and is connected to the draft rod 2 by any suitable means, such as by loop 14 which may be clamped to the band by means of a block 15 and screws 16 in a well known manner. Where two spaced levers 6 are used in the weighing mechanism corresponding bands 11 depending from said levers may be clamped to the loop 14 by block 15 and screws 16, as illustrated in Fig. 2. The members 8 are shown arranged in pairs in overlapping relation for each pivot 7, and two of such pairs of members are in spaced relation to support the pivots 7 on opposite sides of lever 6, as illustrated in Fig. 4. It is desirable to maintain the members 8 in proper relation to the corresponding pivot 7, to provide for proper and free rotation of said pivots, and to permit the members to rock or move freely under the pivots without restriction during the weighing operation. In case the members 8 should be displaced from such proper relation to the pivots 7, as by reason of shocks or jars to which the scale mechanism may be subjected, or by reason of creeping or skidding of the members with respect to the corresponding pivot 7 or vice versa, resistance to the proper or free rotation of pivots upon the members may occur, tending to inaccuracy in the indication of the weight of the article being weighed. In accordance with my improvements I provide means to restore a member 8 to its proper relation to the pivot 7 at the termination of each weighing operation, in case such member may have become displaced from such position, so that each time a weighing operation commences the members 8 will be in their proper positions for weighing. For such purpose I provide the pivots 7 with projections or fingers 17, 18 that extend from each pivot 7 in position to coöperate with a corresponding member 8 upon the return of a lever 6 to zero from a weighing position, to push or move such member 8 back to its proper position with relation to pivot 7, in case such member may have been displaced therefrom. The projections 17, 18 are shown secured in proper positions upon pivots 7 by means of screws 19, passing through the projections and threaded in the pivots. In Figs. 1, 2, 3 and 4 the projections 17, 18 are shown located on the side of the corresponding pivot 7 such as to move in the direction away from members 8 when the latter are rocked by the pivots 7, as the levers 6 swing at their lower ends outwardly during the weighing operation, as by turning in the direction of the arrows in Fig. 2. In case a member 8 may become displaced from its proper relation to pivot 7 in the direction of fingers 17 or 18, the latter, upon the stroke of the corresponding lever 6 returning from the weighing position, will engage such member and will push it under the pivot back to its proper position with relation thereto. I provide back stops for said members indicated at 20, adapted to be engaged by the corresponding member 8 when it is pushed by a finger 17 or 18 at or back of the zero position of the corresponding lever 6. I have shown the stops 20 as adjustable toward and from the corresponding members 8, said stops being illustrated in the form of screws adjustably carried by supports or arms 21 secured to frame 4 by screws. At 22 are stops on the sides of the corresponding members 8 opposite the respective stops 20, and spaced in suitable position whereby the members may have suitable rocking movement between opposing stops 20 and 22. The stops 22 are shown in the form of screws adjustably carried by supports or arms 23 that are secured upon frame 4 by screws. When the parts are in the zero position, such as illustrated in Figs. 1 and 3, the projections 17, 18 may be in close juxtaposition with relation to the corresponding member 8, which then may be slightly out of contact with the associate back stop 20, and the stops 22 will be set in such position as to permit the desired freedom of movement of the members 8 toward such stops when operated by the rotation of the corresponding pivots 7 during the weighing action. When weight is placed upon the scale platform or pan, and the draft rod is pulled down thereby causing the lever or arm 6 to swing outwardly from frame 4, substantially as indicated in Fig. 2, the members 8 will be rocked by the corresponding pivots 7 then rotating in the direction of the arrows in Figs. 2, whereby the members 8 will be moved away from the stops 20 and toward the stops 22, the fingers 17 and 18 correspondingly moved away from the members 8 (due to the difference in radius from the axes of pivots 7 to the operating projections 17, 18 as compared to the radius of members 8 from their pivotal points on the knife edges to their curved peripheries 8ᵃ), so as not to interfere with the free movements of members 8. When the article being weighed is removed from the scale platform or pan, the lever 6 will swing reversely, and will cause the members 8 to return toward the stops 20. If the members 8 have remained in proper position with relation to the pivots 7, the projections 17, 18 will not interfere with the proper return of members 8 to the zero positions, but in case one or more members 8 may have been displaced from its proper position, say toward the corresponding stop 22, by reason of shocks, jars, creeping or skidding of a member with relation to its pivot, or for other reason, then upon return of the corresponding lever 6 toward zero position the projection 17 or 18 for such member will engage or coact with the latter as such finger returns to the zero position and will push such member under its pivot 7 to assure the restoration of such member to its proper position when the parts are again at zero. In other words, the projection 17 or 18 by coaction with the then advanced member 8 will move the latter relatively to the corresponding pivot 7 regardless of or additional to the movement of such member by rotation of pivot 7 thereon. By preference the stop 20 and the corresponding projection 17 or 18 will be in such spaced relation when the parts are at zero that the member 8 therebetween will be slightly out of contact with such stop and projection (Fig. 3). When a lever 6 returns to zero it will pass behind its zero position for a short distance against a stop, such as against the frame 4 as at 4ᶜ (Fig. 1), whereby the projections 17 and 18 may push the members 8 into engagement with the corresponding stops 20, to assure the proper position of said members for the next weighing operation, and when the levers 6 are relieved of their momentum in such direction, and return to their balanced normal or zero positions, the fingers 17, 18 will be correspondingly moved in the direction away from stops 20 and the members 8 will correspondingly be moved by the pivots 7. If a member 8 should have been displaced from its proper relation to pivot 7 in a direction toward stop 20, then when the corresponding lever 6 swings back toward zero from a weighing operation, the member 8 will encounter and be stopped by its stop 20 and the pivot 7 will rotate or skid on such member, the lever being stopped at 4ᶜ whereby the proper relation of the member to the pivot will be restored for the next weighing operation. The stops 22 may be set in such a position as to be quite near to the members 8 when the latter have been moved by the corresponding pivots 7 to their limit during a weighing operation for the full capacity of the scale, whereby if a member should move under its pivot in the direction of stop 22, as by reason of shocks, jars, creeping or otherwise, such movement of said member will be stopped by stop 22, whereby projection 17 or 18 may engage such member on the return stroke of the corresponding lever 6 toward zero, to restore said member to its proper position in manner before described.

Any suitable means may be provided to cause indication of the weight of articles being weighed. I have shown a pointer 25 adapted to sweep over dial A in an ordinary manner, which pointer is secured to a shaft 26 shown journaled upon anti-friction rollers 27 journaled in bearings upon frame 4, in an ordinary manner. Said shaft is shown provided with a pinion 28 in mesh with a rack 29 carried by an arm 30 pivotally supported at 31, on an upright 31ª from frame 1. Means are interposed between one of the levers 6 and arm 30 for rocking the latter and the rack to rotate the pointer or indicator. I have shown arm 30 provided with an extension 30ª carrying a cam member 32 that is coöperative with an arm 33 extending from a lever 6, an anti-friction roller or projection at 34 carried by said arm being preferably operative in the slot 32ª of cam member 32. The cam member has slots 36 receiving bolts or screws 37 whereby the cam member may be adjusted relatively to arm 33 as required. The arrangement is such that when lever 6 swings upwardly the arm 33 will operate the cam member 32 to cause operation of arm 30 and rack 29 for rotating the pointer or indicator 25 to indicate the weight of the article being weighed, the pointer or indicator being restored to zero when lever 6 returns to zero.

My improvements provide a simple and efficient means to assure the proper position of the members 8 with relation to the corresponding pivots 7 for the commencement of each weighing operation without the interposition between such members and pivots of any devices that would have a tendency to resist the free movement of members 8 by the rolling of pivots 7 thereon during the weighing operation, and yet affording means to assure the proper positions of said members when the parts are at zero for the commencement of a weighing operation, accomplished during the return of the parts to zero.

In the modification illustrated in Figs. 5 and 6 the projections 17, 18 are adapted to engage projections 8ᵇ carried by the members 8 and shown extending from the sides thereof, instead of directly engaging the members 8 on their side edges or in the plane thereof, as illustrated in the other figures of the drawings. The projections 8ᵇ may be provided with anti-friction rollers 8ᶜ for engagement with the projections 17, 18 to reduce friction. In the form shown in Figs. 6 and 7 the inner edges 17ª, 18ª of the projections 17, 18 are shown suitably curved, as in cam-like form, with respect to the axes of pivot 7 for the purpose of closely following the movements of members 8, notwithstanding the difference in radius of pivot 7 with respect to the radius of member 8, whereby the projections 17, 18 will retain proper coactive relation to the projections 8ᵈ of member 8 in all positions of said parts during operation.

While I have illustrated and described a practical embodiment of my invention, it will be understood that my invention is not limited to the details of construction and relative arrangement of parts set forth, since the same may be varied, within the scope of the appended claims, without departing from the spirit of the invention.

Having now described my invention what I claim is:—

1. A measuring instrument comprising a lever having pivots, movable members adapted to support said pivots, means movably supporting said members, and means coöperative between said members and pivots permitting the members to be moved by the pivots freely and unobstructed in one direction and causing said members to be restored to proper relation to the pivots when moved in another direction.

2. A measuring instrument comprising a lever having pivots, movable members adapted to support said pivots, means movably supporting said members, back stops to limit movement of said members in one direction, means coöperative between said members and pivots permitting the members to be moved by the pivots freely and unobstructed away from said stops and causing said members to be restored to proper relation to the pivots when moved in the reverse direction and to engage said stops.

3. A measuring instrument comprising a lever having pivots, movable members adapted to support said pivots, means movably supporting said members, back stops to limit movement of said members in one direction, means coöperative between said members and pivots permitting the members to be moved by the pivots freely and unobstructed away from said stops and causing said members to be restored to proper relation to the pivots when moved in the reverse direction and to engage said stops, and stops on the sides of said members opposite the said back-stops to limit movement of the members in the weighing direction.

4. A measuring instrument comprising a lever having pivots, movable members adapted to support said pivots, means movably supporting said members, and projections connected with said pivots and coöperative with said members to restore said members to proper relation to the pivots in case the members have been displaced therefrom when moving in one direction and movable free from said members when moving in another direction to permit the members to be moved by the pivots in such direction unobstructed by such projections.

5. A measuring instrument comprising a lever having pivots, movable members adapted to support said pivots, means for movably supporting said members, and projections connected with said pivots to coöperate with said members and located in position to move away from but in the direction of movement of said members during a weighing operation without restricting the movement of said members and to move toward and coöperate with said members when moved from the weighing position to restore said members to proper position with relation to the pivots in case the members have been displaced from such position.

6. A measuring instrument comprising a lever having pivots, movable members adapted to support said pivots, means for movably supporting said members, and projections connected with said members to coöperate with said members and located in position to move away from but in the direction of movement of said members during a weighing operation without restricting the movement of said members and to move toward and coöperate with said members when moved from the weighing position, to restore said members to proper position with relation to the pivots in case the members have been displaced from such position, and stops coöperative with said members when they have reached or have moved back of the zero position.

7. A measuring instrument comprising a lever having pivots, movable members adapted to support said pivots, means for movably supporting said members, and projections connected with said members to coöperate with said members and located in position to move away from but in the direction of movement of said members during a weighing operation without restricting movement of said members and to move toward and coöperate with said members when moved from the weighing position to restore said members to proper position with relation to the pivots in case the members have been displaced from such position, stops coöperative with said members when they have reached or have moved back of the zero position, and stops on the sides of said members opposite the first named stops to limit movement of the members in the weighing direction.

8. A measuring instrument comprising a lever having pivots on opposite sides, spaced movable members for each pivot, means movably supporting said members, and spaced projections carried by each pivot to coöperate with a corresponding movable member, said projections being in position to permit the members to move freely without obstruction by said projections during weighing and to engage said members to restore them to proper positions relatively to the pivots in case the members have been displaced therefrom.

9. A measuring instrument comprising a lever having pivots on opposite sides, spaced movable members for each pivot, means movably supporting said members, and spaced projections carried by each pivot to coöperate with a corresponding movable member, said projections being located on the sides of the pivots toward which said members move during weighing to then move away from said members and to engage said members upon the return movement of the pivots in case said members have been displaced in the direction of the projections.

10. A measuring instrument comprising a lever having pivots on opposite sides, spaced movable members for each pivot, means movably supporting said members, and means coöperative between said members and pivots permitting the members to be moved by the pivots freely and unobstructed in one direction and causing said members to be restored to proper relation to the pivots when moved in another direction, and adjustable stops spaced on opposite sides of said members to limit their movements in opposite directions.

11. A measuring instrument comprising a lever having pivots on opposite sides, spaced movable members for each pivot, means movably supporting said members, means coöperative between said members and pivots permitting the members to be moved by the pivots freely and unobstructed in one direction and causing said members to be restored to proper relation to the pivots when moved in another direction, and arms spaced on opposite sides of said members and provided with stops to limit movement of said members in opposite directions.

12. In a measuring instrument the combination of a lever having pivots, movable members supporting the pivots, means movably supporting the members to rock, an indicator, an arm having a rack, a pinion coöperative with the rack for operating the indicator, a cam member operatively connected with said arm, and means carried by the lever coöperative with the cam member for operating the latter to actuate the indicator.

13. In a measuring instrument the combination of a lever having pivots, movable members supporting the pivots, means movably supporting the members to rock, an indicator, an arm having a rack, a pinion coöperative with the rack for operating the indicator, said arm being provided with an extension, a cam member, means adjustably connecting the cam member with said extension, and an arm connected with said lever and coöperatively with the cam member for operating the rack to actuate the indicator.

Signed at New York city, in the county of New York, and State of New York, this 7th day of May, A. D. 1917.

CARL F. LARSON.

Witnesses:
T. F. BOURNE,
MARIE F. WAINRIGHT.